(12) United States Patent
Min

(10) Patent No.: US 12,151,531 B2
(45) Date of Patent: Nov. 26, 2024

(54) ELECTRONIC CONTROL SUSPENSION SYSTEM FOR A VEHICLE AND A CONTROL METHOD THEREOF

(71) Applicant: HL MANDO CORPORATION, Pyeongtaek (KR)

(72) Inventor: Kyung Hyun Min, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 11 days.

(21) Appl. No.: 17/730,242

(22) Filed: Apr. 27, 2022

(65) Prior Publication Data
US 2022/0363102 A1 Nov. 17, 2022

(30) Foreign Application Priority Data
May 11, 2021 (KR) .......................... 10-2021-0060830

(51) Int. Cl.
*B60G 17/0165* (2006.01)

(52) U.S. Cl.
CPC .. *B60G 17/0165* (2013.01); *B60G 2400/0511* (2013.01); *B60G 2400/0512* (2013.01); *B60G 2400/824* (2013.01); *B60G 2401/14* (2013.01); *B60G 2500/104* (2013.01); *B60G 2800/012* (2013.01); *B60G 2800/014* (2013.01)

(58) Field of Classification Search
CPC ........ B60G 17/0165; B60G 2400/0511; B60G 2400/1512; B60G 2400/824; B60G 2401/14; B60G 2500/104; B60G 2500/280012; B60G 2800/014; B60G 24/0082; B60G 2401/142; B60G 2401/174; B60G 2800/912; B60G 17/018; B60W 10/22; B60W 40/06; B60W 2050/009; B60W 2420/42; B60W 2420/52

See application file for complete search history.

(56) References Cited

U.S. PATENT DOCUMENTS

| | | | | |
|---|---|---|---|---|
| 2003/0205867 A1* | 11/2003 | Coelingh | ............. | B60G 17/018 280/5.5 |
| 2004/0038599 A1* | 2/2004 | Kou | ....................... | B60G 17/06 439/894 |
| 2005/0021205 A1* | 1/2005 | Niwa | .................... | B60G 17/016 701/37 |
| 2005/0113998 A1* | 5/2005 | Kim | ..................... | B60G 17/018 701/37 |

(Continued)

FOREIGN PATENT DOCUMENTS

| | | | | |
|---|---|---|---|---|
| GB | 2607126 A | * 11/2022 | ......... | B60G 17/0165 |
| JP | 2009227036 A | 10/2009 | | |

OTHER PUBLICATIONS

Office Action dated Sep. 19, 2024 in connection with a corresponding Korean Patent Application.

*Primary Examiner* — Karen Beck
(74) *Attorney, Agent, or Firm* — Harvest IP Law, LLP

(57) ABSTRACT

An electronic control suspension system for a vehicle is proposed. The electronic control suspension system includes a detection unit detecting information on a road in front of the vehicle, an electronic control suspension which damping force is controlled by current, and a control unit is configured to adjust the damping force of the electronic control suspension according to the information detected by the detection unit.

16 Claims, 6 Drawing Sheets

(56) References Cited

U.S. PATENT DOCUMENTS

| | | | |
|---|---|---|---|
| 2013/0103259 A1* | 4/2013 | Eng | B60G 17/0165 |
| | | | 701/37 |
| 2013/0218414 A1* | 8/2013 | Meitinger | B60W 10/20 |
| | | | 701/38 |
| 2019/0359025 A1* | 11/2019 | Wager | B60G 21/073 |
| 2022/0063364 A1* | 3/2022 | Tao | B60G 17/0155 |
| 2022/0363102 A1* | 11/2022 | Min | B60G 17/06 |

* cited by examiner

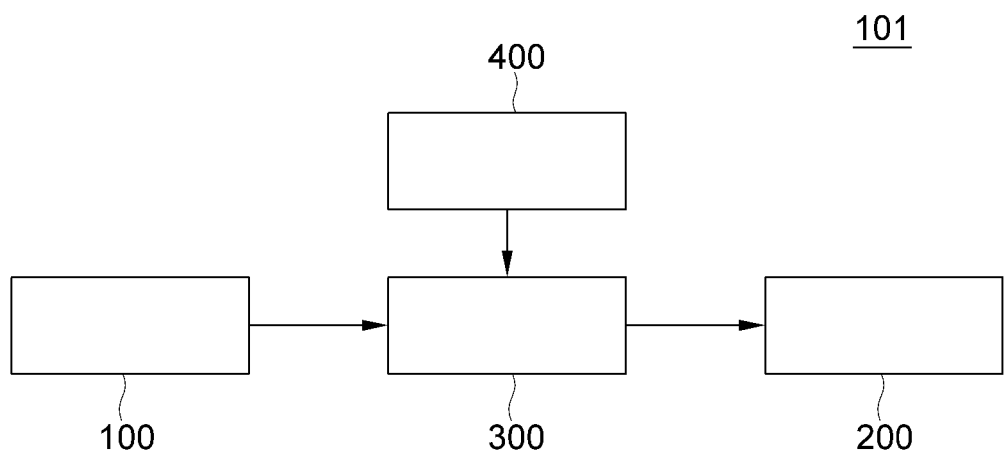
[Fig.1]

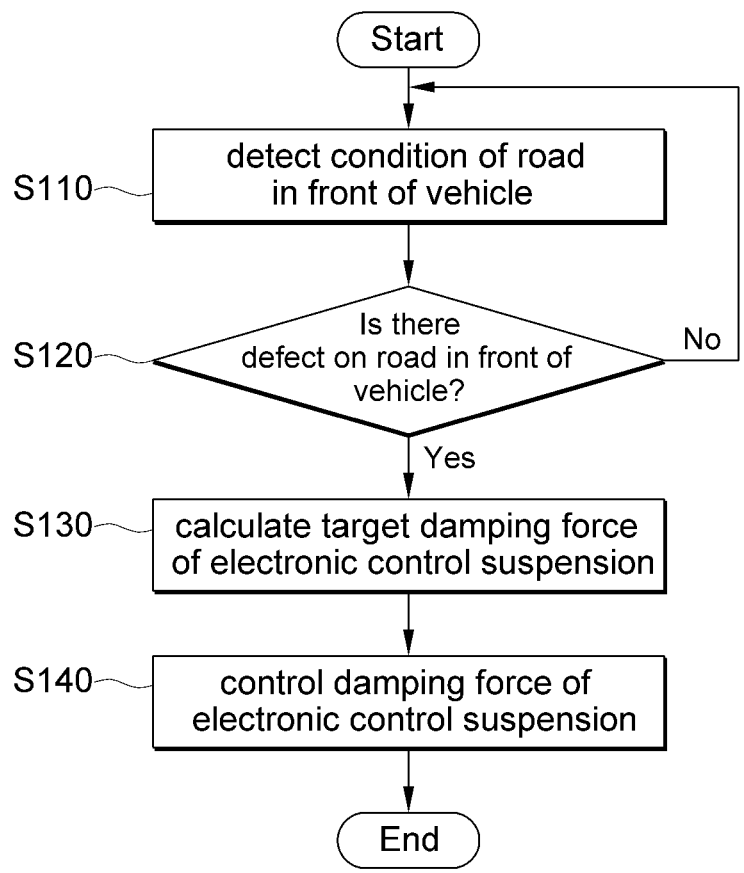
[Fig.2]

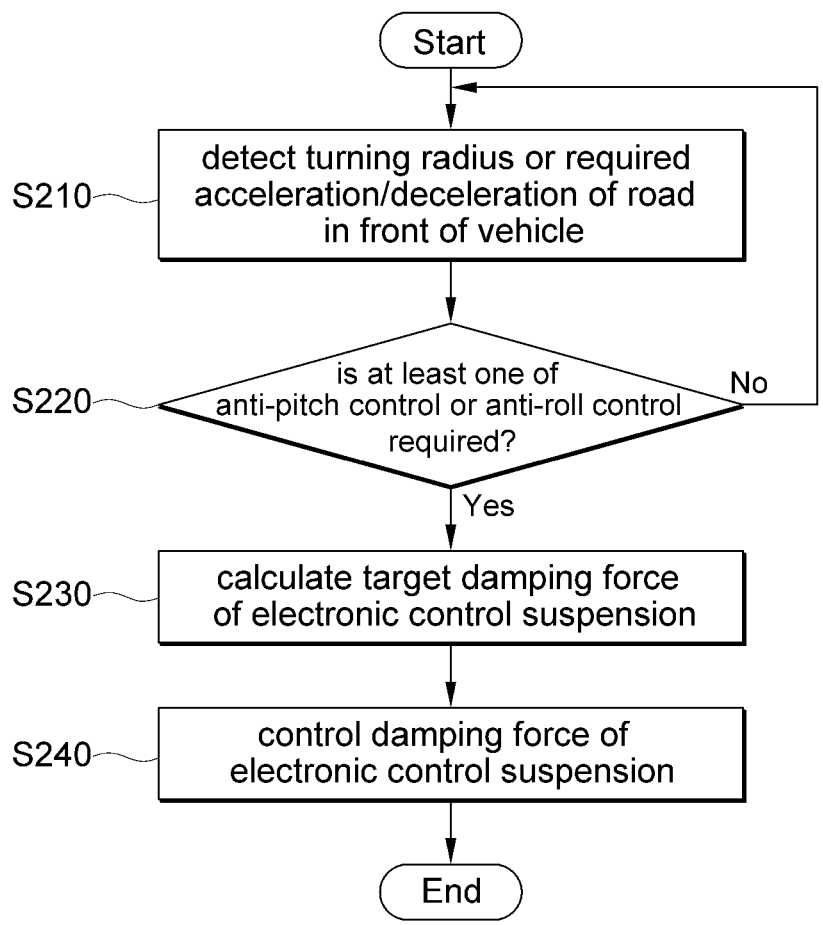
[Fig.3]

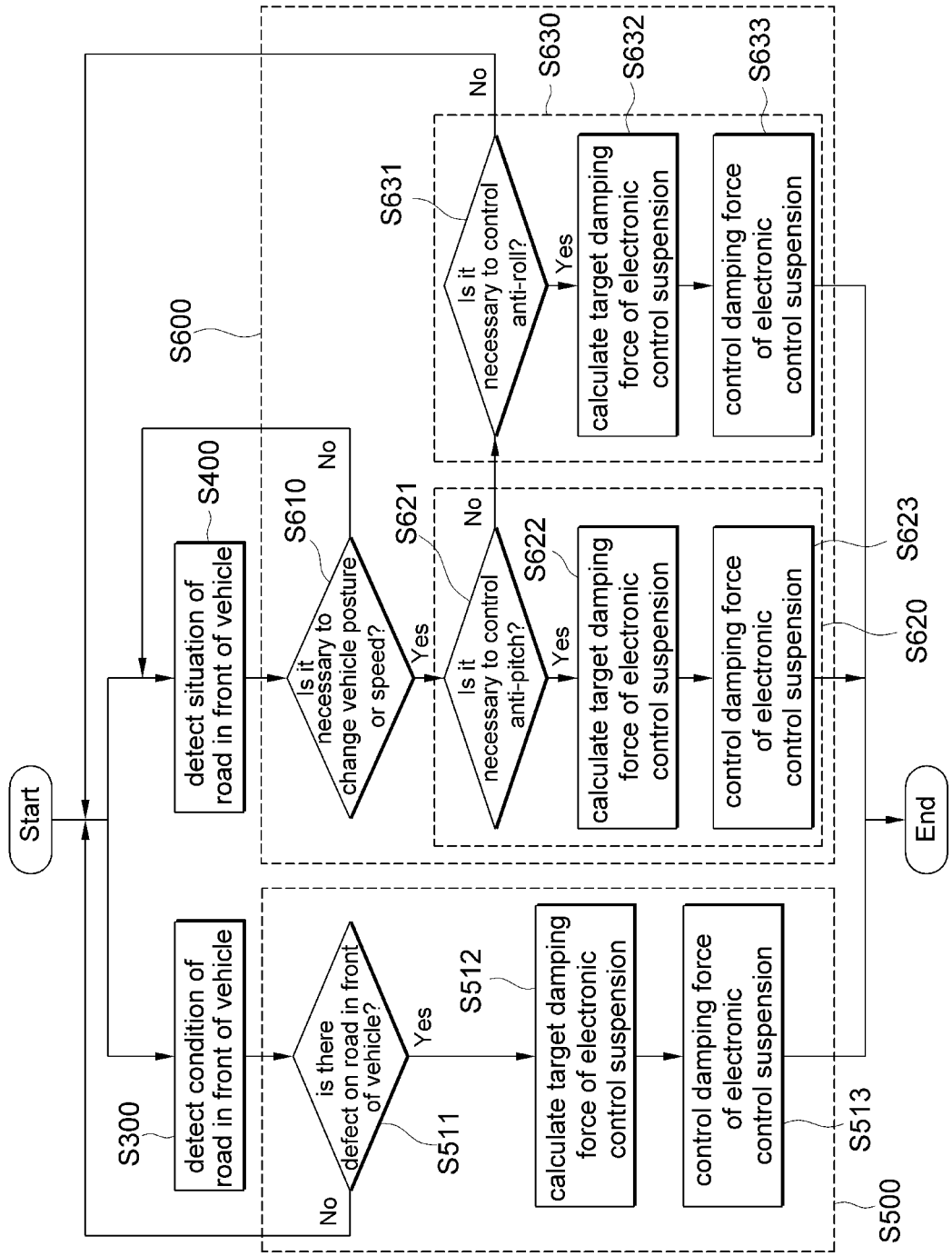
[Fig.4]

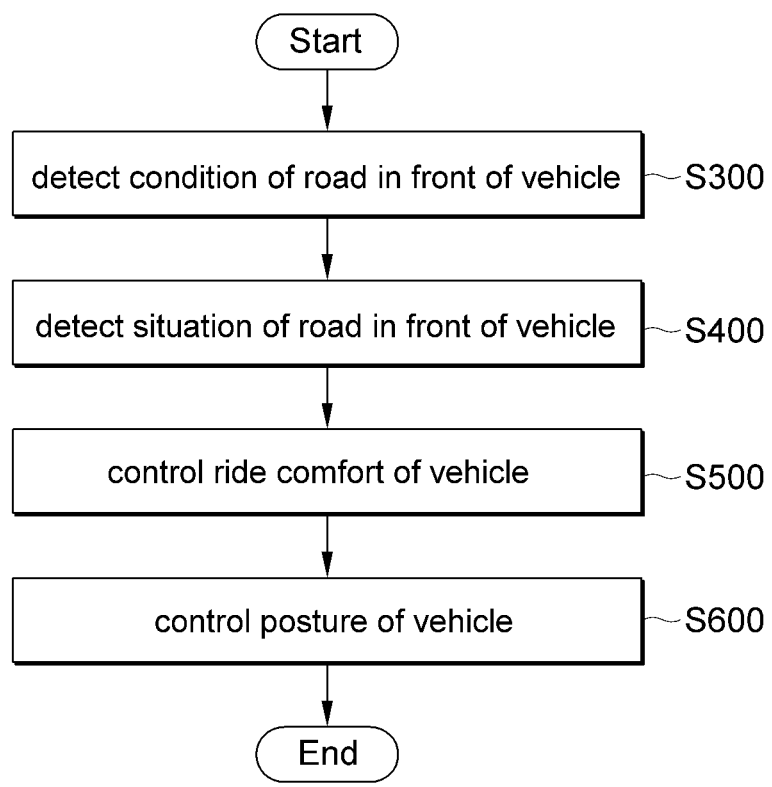
[Fig.5]

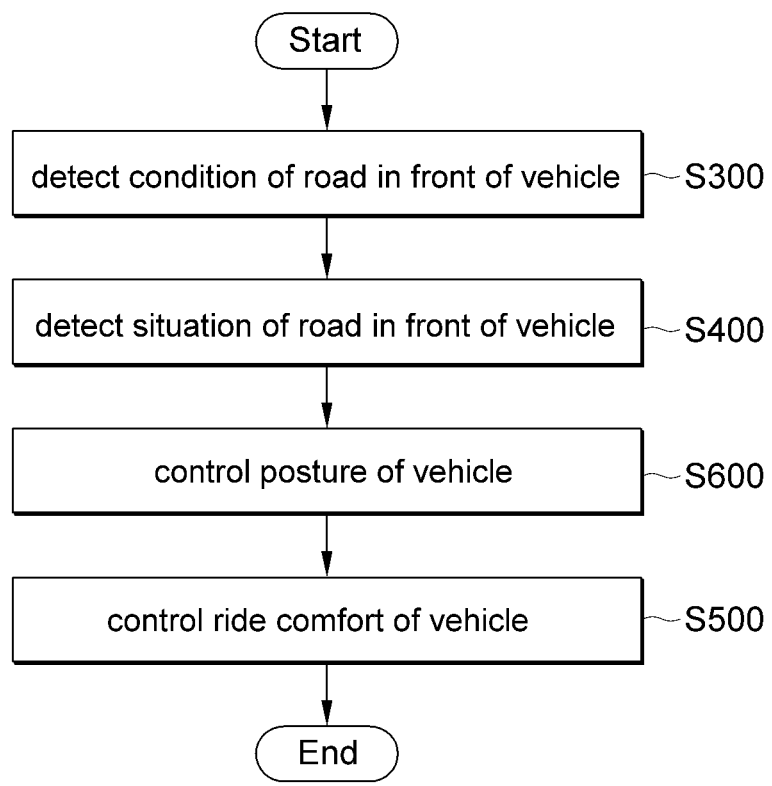
[Fig.6]

ELECTRONIC CONTROL SUSPENSION SYSTEM FOR A VEHICLE AND A CONTROL METHOD THEREOF

CROSS-REFERENCE TO RELATED APPLICATIONS

This application claims benefit and priority to Korean Patent Application No. 10-2021-0060830, filed on May 11, 2021, with the Korean Intellectual Property Office, the disclosure of which is incorporated herein in its entirety by reference.

TECHNICAL FIELD

The present disclosure relates to an electronic control suspension system for a vehicle and a control method thereof and, more particularly, to an electronic control suspension system for a vehicle and a control method thereof, which are intended to control an electronic control suspension based on information on a road in front of the vehicle before the vehicle enters the road, thus controlling the ride comfort of the vehicle and the posture of the vehicle, and thereby improving ride comfort and reducing the risk of overturning the vehicle.

BACKGROUND

In general, an electronic control suspension system for a vehicle electrically controls the damping force of a suspension. Conventionally, this damping force is controlled at a current point in time when a vehicle passes.

Depending on the driving condition of a vehicle that is currently passing, the electronic control suspension system is controlled. Specifically, the electronic control suspension system receives a feedback signal measured depending on the driving condition of the vehicle and then is controlled. In this case, since the electronic control suspension system is controlled based on information on a state in which the vehicle is currently passing, the effect of the improvement of the ride comfort felt by a driver is slight.

In other words, since the electronic control suspension system is controlled depending on information on the driving condition of the vehicle that is already running, it has only the effect of correcting the posture of the vehicle.

Cited Document

Patent Document (Patent Document 1) KR 10-0517208 B1 (Sep. 27.2005)

SUMMARY

In view of the above, the present disclosure provides an electronic control suspension system for a vehicle and a control method thereof, which control an electronic control suspension in advance based on information on a road in front of the vehicle before the vehicle enters the road, thus controlling the ride comfort of the vehicle and the posture of the vehicle, and thereby improving ride comfort and reducing the risk of overturning the vehicle.

According to an embodiment of the present disclosure, an electronic control suspension system for a vehicle includes a detection unit detecting information on a road in front of the vehicle, an electronic control suspension which damping force is controlled by current, and a control unit is configured to adjust the damping force of the electronic control suspension according to the information detected by the detection unit.

The detection unit may detect information on a condition of the road in front of the vehicle.

The detection unit may detect information on a turning state of the road in front of the vehicle.

The control unit may control the damping force of the electronic control suspension so as to prevent the vehicle from being rotated about a longitudinal axis thereof, based on the information detected by the detection unit.

The detection unit may detect information indicating whether it is necessary to accelerate or decelerate the vehicle on the road in front of the vehicle.

The control unit may control the damping force of the electronic control suspension so as to prevent the vehicle from being rotated about a transverse axis thereof, based on the information detected by the detection unit.

The detection unit may be any one of a camera, a radar, and a lidar.

According to an embodiment of the present disclosure, a method of controlling an electronic control suspension system for a vehicle includes detecting information on a condition of a road in front of the vehicle, detecting situation information on the road in front of the vehicle, controlling a damping force of the electronic control suspension based on the information on the condition of the road, thus controlling ride comfort of the vehicle, and controlling the damping force of the electronic control suspension based on the situation information on the road, thus controlling a posture of the vehicle.

The controlling of the ride comfort of the vehicle may include determining whether there is a defect on the road in front of the vehicle according to the information on the condition of the road, calculating a target damping force of the electronic control suspension depending on a defect degree of the road condition, when it is determined that there is the defect on the road in front of the vehicle, and controlling current supplied to the electronic control suspension so that the electronic control suspension has the calculated target damping force.

The controlling of the posture of the vehicle may include determining whether an anti-roll posture control is required so as to prevent the vehicle from being rotated about a longitudinal axis of the vehicle, when the detected situation information on the road in front of the vehicle is turning-state information of the road in front of the vehicle, and determining whether an anti-pitch posture control is required so as to prevent the vehicle from being rotated about a transverse axis of the vehicle, when the detected situation information on the road in front of the vehicle is information indicating whether it is necessary to accelerate or decelerate the vehicle on the road in front of the vehicle.

The controlling of the posture of the vehicle may include, when it is determined that the anti-roll posture control is required, calculating a target damping force of the electronic control suspension depending on a turning-state degree of the road in front of the vehicle, and controlling current supplied to the electronic control suspension so that the electronic control suspension has the calculated target damping force.

The controlling of the posture of the vehicle may include, when it is determined that the anti-pitch posture control is required, calculating a target damping force of the electronic control suspension depending on a required acceleration or deceleration degree on the road in front of the vehicle, and controlling current supplied to the electronic control suspension so that the electronic control suspension has the calculated target damping force.

The controlling of the ride comfort of the vehicle may be performed prior to the controlling of the posture of the vehicle.

The controlling of the posture of the vehicle may be performed prior to the controlling of the ride comfort of the vehicle.

The priority of the controlling of the ride comfort of the vehicle and the controlling of the posture of the vehicle may be selected by a user.

According to embodiments of the present disclosure, an electronic control suspension system for a vehicle and a control method thereof are advantageous in that an electronic control suspension is controlled in advance based on information on a road where the vehicle enters, thus improving the ride comfort of the vehicle and reducing the risk of overturning the vehicle.

BRIEF DESCRIPTION OF THE DRAWINGS

FIG. 1 is a diagram illustrating the configuration of an electronic control suspension system for a vehicle according to an embodiment of the present disclosure.

FIG. 2 illustrates the process of controlling the ride comfort of a vehicle according to an embodiment of the present disclosure.

FIG. 3 illustrates the process of controlling the posture of a vehicle according to an embodiment of the present disclosure.

FIG. 4 illustrates the control process of an electronic control suspension system for a vehicle according to an embodiment of the present disclosure.

FIG. 5 illustrates the control process of an electronic control suspension system for a vehicle according to another embodiment of the present disclosure.

FIG. 6 illustrates the control process of an electronic control suspension system for a vehicle according to a further embodiment of the present disclosure.

DETAILED DESCRIPTION

Hereinafter, an embodiment of the present disclosure will be described in detail with reference to the accompanying drawings so that a person having ordinary skill in the art to which the present disclosure belongs can easily carry out this embodiment. The present disclosure may be implemented in various forms without being limited to the following embodiments.

It is to be noted that the drawings are schematic and not drawn to scale. Relative dimensions and proportions of parts in the drawings may be exaggerated or reduced for the sake of clarity and convenience, and any dimensions are merely illustrative and not restrictive. Further, the same reference numerals are used throughout the drawings to designate the same or similar components.

The embodiment of the present disclosure specifically represents an ideal form of the present disclosure. Thus, various modifications of the diagrams are expected. Therefore, an embodiment is not limited to a specific form as shown in the drawings, and covers, for example, a change in a form by manufacturing.

Hereinafter, an electronic control suspension system 101 for a vehicle according to an embodiment of the present disclosure will be described with reference to FIGS. 1 to 3.

As shown in FIG. 1, the electronic control suspension system 101 for the vehicle according to an embodiment of the present disclosure includes a detection unit 100, an electronic control suspension 200, and a control unit 300.

The detection unit 100 detects information on a road in front of the vehicle. Specifically, the detection unit 100 is installed in the vehicle to detect information on the road in front of the vehicle where the vehicle is running. Further, the detection unit 100 may detect information on the road in front of the vehicle where the vehicle has not passed yet. That is, the detection unit 100 may detect, in advance, information on the road where the vehicle will pass.

For instance, the detection unit 100 may be installed in the vehicle such as an autonomous vehicle to detect information on the road in front of the vehicle where the vehicle will travel and then utilize the information as the control information of the electronic control suspension 200.

The damping force of the electronic control suspension 200 is adjusted by current supplied to the suspension of the vehicle. Specifically, the electronic control suspension (ECS) 200 is the suspension of the vehicle that controls a spring constant or damping force depending on the supplied current. Further, the electronic control suspension 200 may adjust the height and posture of the vehicle. Furthermore, the electronic control suspension 200 may control the vehicle to be lowered or raised to one side or the other side. Thus, the electronic control suspension 200 may control the posture of the vehicle or the ride comfort of the vehicle by controlling the damping force.

The control unit 300 receives information detected by the detection unit 100. Further, the control unit 300 may adjust the damping force of the electronic control suspension 200. Furthermore, the control unit 300 may determine whether it is necessary to adjust the damping force of the electronic control suspension 200 based on the information detected by the detection unit 100. Specifically, the control unit 300 may adjust the damping force by controlling current supplied to the electronic control suspension 200.

In other words, the control unit 300 may compare information detected by the detection unit 100 with preset reference information to determine whether it is necessary to adjust the damping force of the electronic control suspension 200, and then may adjust the damping force of the electronic control suspension 200 according to the determined result.

Furthermore, the detection unit 100 of the electronic control suspension system 101 for the vehicle according to an embodiment of the present disclosure may detect information on the condition of the road in front of the vehicle.

The detection unit 100 may detect information on the condition of the road in front of the vehicle. Specifically, the detection unit 100 may detect whether there is a defect on a road surface in front of a road where the vehicle is running. For instance, the detection unit 100 may detect a defect, such as a bump or a sinkhole, affecting the driving and ride comfort of the vehicle on the road surface in front of the vehicle.

Specifically, the control unit 300 may receive the information on the condition of the road in front of the vehicle, which is detected by the detection unit 100, and then determine whether there is a defect on the road surface in front of the vehicle. Further, when it is determined that there is a defect on the road surface in front of the vehicle, the control unit 300 may control the current so as to adjust the damping force of the electronic control suspension 200.

As shown in FIG. 2, the detection unit 100 installed in the vehicle detects the information on the condition of the road in front of the vehicle before the vehicle passes (S110).

Further, the control unit 300 determines whether there is a defect on the road where the vehicle will enter, based on the information on the condition of the road in front of the vehicle, which is detected by the detection unit 100 (S120). Specifically, a reference for determining whether there is a defect on the road in front of the vehicle based on the information detected by the detection unit 100 is preset in the control unit 300. Thus, on the basis of the preset reference, the control unit 300 may determine whether there is a defect on the road where the vehicle will enter based on the information detected by the detection unit 100. Further, the damping force of the electronic control suspension is preset in the control unit 300 depending on the degree of the defect on the road where the vehicle will enter.

Furthermore, the control unit 300 compares the current damping force of the electronic control suspension with the preset damping force of the electronic control suspension corresponding to the defect degree of the road in front of the vehicle, and then calculates a target damping force of the electronic control suspension, which controls the electronic control suspension (S130).

Further, the control unit 300 controls a current amount supplied to the current electronic control suspension 200 so that the electronic control suspension 200 has the calculated target damping force (S140). Therefore, the control unit 300 may control the current amount supplied to the current electronic control suspension 200 so that the electronic control suspension 200 has the calculated target damping force. Here, the target damping force of the electronic control suspension 200 may be the target damping force for the ride comfort control of the electronic control suspension 200 so as to control the ride comfort of the vehicle.

Alternatively, when the control unit 300 determines that there is no defect on the road in front of the vehicle based on the information detected by the detection unit 100, the detection unit 100 detects information on the road in front of the vehicle again (S110).

Further, the detection unit 100 of the electronic control suspension system 101 for the vehicle according to an embodiment of the present disclosure may detect situation information on the road in front of the vehicle.

Specifically, situation information on the road in front of the vehicle may be turning-state information of the road in front of the vehicle. The detection unit 100 may detect the turning-state information of the road in front of the vehicle.

The detection unit 100 may detect the turning-state information of the road where the vehicle will enter, and then transmit the information to the control unit 300. That is, the detection unit 100 may detect the turning angle of the road where the vehicle runs and enters, and information on the turning angle.

At this time, the control unit 300 may control the damping force of the electronic control suspension 200 so as to prevent the vehicle from being rotated about a longitudinal axis based on the turning-state information of the road in front of the vehicle, which is detected by the detection unit 100.

The control unit 300 determines whether there is a risk that a currently driving vehicle may rotate about the longitudinal axis of the vehicle (virtual central axis parallel to the advancing direction of the vehicle) according to the turning-state information of the road in front of the vehicle, which is detected by the detection unit 100. When it is determined that there is the risk, the heights of the left and right sides of the vehicle may be adjusted by controlling the damping force of the electronic control suspension 200. That is, the control unit 300 may determine, in advance, whether there is a roll risk that the vehicle may rotate about the longitudinal axis when the current vehicle enters the road, according to the turning-state information of the road in front of the vehicle, which is detected by the detection unit 100. Therefore, when it is determined that there is the risk due to the roll, the control unit 300 may control the damping force of the electronic control suspension 200 to allow the vehicle to be stably driven.

Further, the situation information on the road in front of the vehicle may determine whether it is necessary to accelerate or decelerate the vehicle depending on the road in front of the vehicle. The detection unit 100 may detect information indicating whether it is necessary to accelerate or decelerate the vehicle on the road in front of the vehicle.

The detection unit 100 may detect information indicating whether it is necessary to accelerate or decelerate the vehicle when the vehicle enters the road to move thereon, and transmit the information to the control unit 300. In other words, the detection unit 100 may detect whether a change in the state of the vehicle, such as acceleration or deceleration, is required depending on the road where the vehicle travels and then enters.

For instance, the detection unit 100 may change information such as a change in the width of the road in front of the vehicle or a change in the inclination of the road in front of the vehicle.

Here, the control unit 300 may control the damping force of the electronic control suspension 200 so as to prevent the vehicle from being rotated about the transverse axis of the vehicle based on the information indicating whether it is necessary to accelerate or decelerate the vehicle on the road in front of the vehicle, which is detected by the detection unit 100.

The control unit 300 determines whether there is a risk that a currently driving vehicle may rotate about the transverse axis of the vehicle (virtual central axis perpendicular to the advancing direction of the vehicle) according to the information indicating whether it is necessary to accelerate or decelerate the vehicle on the road in front of the vehicle, which is detected by the detection unit 100. When it is determined that there is the risk, the heights of the front and rear of the vehicle may be adjusted by controlling the damping force of the electronic control suspension 200. That is, the control unit 300 may determine, in advance, whether there is a pitch risk that the vehicle may rotate about the transverse axis when the current vehicle enters the road, according to the information indicating whether it is necessary to accelerate or decelerate the vehicle on the road in front of the vehicle, which is detected by the detection unit 100. Therefore, when it is determined that there is the risk due to the pitch, the control unit 300 may control the damping force of the electronic control suspension 200 to allow the vehicle to be stably driven.

As shown in FIG. 3, the detection unit 100 installed in the vehicle detects at least one of turning radius information that is the turning state of the road in front of the vehicle or the information indicating whether it is necessary to accelerate or decelerate the vehicle on the road in front of the vehicle (S210).

The control unit 300 determines whether it is necessary to change the posture of the vehicle into at least one of an anti-roll posture or an anti-pitch posture, based on the information detected by the detection unit 100 (S220).

When the information detected by the detection unit 100 is the turning-state information of the road in front of the vehicle, the control unit 300 may determine whether the vehicle needs more turning or less turning when the vehicle enters the upcoming road.

Specifically, the control unit 300 may compare the driving direction of the current vehicle depending on the turning-state information on the road in front of the vehicle, which is detected by the detection unit 100, and then determine whether it is necessary to further adjust the steering angle compared to current setting when the vehicle enters the upcoming road. When it is determined that it is necessary to further adjust the steering angle compared to the current setting when the vehicle enters the upcoming road, the control unit 300 may determine that the vehicle requires the anti-roll posture control. In other words, the control unit 300 may control the damping force of the electronic control suspension for preventing the vehicle from overturning in response to the steering angle of the vehicle to be changed according to a change in the turning radius of the upcoming road.

The control unit 300 compares the current damping force of the electronic control suspension with the preset damping force of the electronic control suspension corresponding to the turning state of the road in front of the vehicle, and then calculates the target damping force of the electronic control suspension for controlling the electronic control suspension (S230).

Further, the control unit 300 controls a current amount supplied to the current electronic control suspension 200 so that the electronic control suspension 200 has the calculated target damping force (S240). Therefore, the control unit 300 may control the current amount supplied to the current electronic control suspension 200 so that the electronic control suspension 200 has the calculated target damping force. Here, the target damping force of the electronic control suspension 200 may be the target damping force for the anti-roll posture control of the electronic control suspension 200 so as to control the anti-roll posture of the vehicle.

Furthermore, when the information detected by the detection unit 100 is the information indicating whether it is necessary to accelerate or decelerate the vehicle on the road in front of the vehicle, the control unit 300 determines whether it is necessary to accelerate or decelerate the vehicle when the vehicle enters the upcoming road (S210).

Specifically, the control unit 300 may compare a current vehicle speed according to the information indicating whether it is necessary to accelerate or decelerate the vehicle on the road in front of the vehicle, which is detected by the detection unit 100, and then determine whether it is necessary to decelerate or accelerate the vehicle (S220). When it is determined that it is necessary to adjust the current speed of the vehicle when the vehicle enters the upcoming road, the control unit 300 may determine that the vehicle requires the anti-pitch posture control. In other words, the control unit 300 may control the damping force of the electronic control suspension for preventing the vehicle from overturning in response to a change in the speed of the vehicle according to the information indicating whether it is necessary to accelerate or decelerate the vehicle on the road in front of the vehicle.

The electronic control suspension system 101 for the vehicle may further include a state-information detection unit 400 of the vehicle. The state-information detection unit 400 of the vehicle may include any one or more of an acceleration sensor in a longitudinal/transverse direction of a vehicle body, an acceleration sensor in a vertical direction of the vehicle body, a height sensor of a suspension damper, and an acceleration sensor in the vertical direction of a wheel. Therefore, the control unit 300 may receive information from the state-information detection unit 400 of the vehicle to determine the current vehicle speed, posture, etc.

The control unit 300 compares the current damping force of the electronic control suspension with the preset damping force of the electronic control suspension corresponding to the information indicating whether it is necessary to accelerate or decelerate the vehicle on the road in front of the vehicle, and then calculates the target damping force of the electronic control suspension for controlling the electronic control suspension (S230).

Further, the control unit 300 controls a current amount supplied to the current electronic control suspension 200 so that the electronic control suspension 200 has the calculated target damping force (S240). Therefore, the control unit 300 may control the current amount supplied to the current electronic control suspension 200 so that the electronic control suspension 200 has the calculated target damping force. Here, the target damping force of the electronic control suspension 200 may be the target damping force for the anti-pitch posture control of the electronic control suspension 200 so as to control the anti-pitch posture of the vehicle.

Alternatively, when the information detected by the detection unit 100 is at least one of the turning-state information of the road in front of the vehicle or the information indicating whether it is necessary to accelerate or decelerate the vehicle on the road in front of the vehicle, the control unit 300 determines whether any one or more of the anti-roll posture control of the vehicle or the anti-pitch posture control of the vehicle is required (S220).

Specifically, when the control unit 300 determines that both the anti-roll posture control of the vehicle and the anti-pitch posture control of the vehicle are required, the control unit 300 simultaneously controls the anti-roll posture of the vehicle and the anti-pitch posture of the vehicle depending on the information of the detection unit 100, which is preset in the control unit 300. A table may be preset in the control unit 300 to adjust the current damping force of the electronic control suspension so as to simultaneously control the anti-roll posture of the vehicle and the anti-pitch posture of the vehicle depending on the information detected by the detection unit 100 of the vehicle.

The control unit 300 compares the current damping force of the electronic control suspension with the preset damping force of the electronic control suspension corresponding to a degree in which it is necessary to accelerate or decelerate the vehicle on the road in front of the vehicle or a turning-state degree of the upcoming road, and then calculates the target damping force of the electronic control suspension for controlling the electronic control suspension (S230).

Further, the control unit 300 controls a current amount supplied to the current electronic control suspension 200 so that the electronic control suspension 200 has the calculated target damping force (S240). Therefore, the control unit 300 may control the current amount supplied to the current electronic control suspension 200 so that the electronic control suspension 200 has the calculated target damping force. Here, the target damping force of the electronic control suspension 200 may be the target damping force for the anti-roll posture control and the anti-pitch posture control of the electronic control suspension 200 so as to control the anti-roll posture of the vehicle and the anti-pitch posture of the vehicle.

In other words, the control unit 300 may control the damping force of the electronic control suspension so as to simultaneously adjust the anti-roll posture and the anti-pitch posture of the vehicle.

Alternatively, when the control unit 300 determines that it is unnecessary to change the anti-roll posture or anti-pitch posture of the vehicle based on the information detected by the detection unit 100, the detection unit 100 detects the turning-radius information that is the turning state of the upcoming road or the information indicating whether it is necessary to accelerate or decelerate the vehicle on the road in front of the vehicle (S210).

Further, the detection unit 100 of the electronic control suspension system 101 for the vehicle according to an embodiment of the present disclosure may include any one or more of a camera, a radar, and a lidar.

The detection unit 100 may detect information on the road in front of the vehicle using any one or more of the camera, the radar, and the lidar. Based on the information of the detection unit 100, the control unit 300 may determine the degree of a defect on the road in front of the vehicle. Specifically, the detection unit 100 may determine the depth or range of the bump or sinkhole formed in the road based on the information detected by any one of the camera, the radar, and the lidar. Such a determination reference may be preset in the detection unit 100.

Thus, the detection unit 100 may include the above-described components, so that it is possible to effectively detect the information on the road in front of the vehicle before the vehicle enters.

Further, a determination reference for determining the degree of the turning-state information of the road in front of the vehicle, which is detected by the detection unit 100, may be preset in the control unit 300.

Furthermore, a determination reference for determining the degree of the information indicating whether it is necessary to accelerate or decelerate the vehicle on the road in front of the vehicle, which is detected by the detection unit 100, may be preset in the control unit 300.

Hereinafter, a method of controlling an electronic control suspension system for a vehicle according to an embodiment of the present disclosure will be described.

The information on the condition of the road in front of the vehicle is detected (S300). Specifically, the detection unit 100 installed in the vehicle may detect the information on the condition of the road in front of the vehicle before the vehicle passes.

The damping force of the electronic control suspension is controlled based on the detected information on the road condition, thus controlling the ride comfort of the vehicle (S500). Specifically, the control unit 300 may control the damping force of the electronic control suspension 200 based on the information on the condition of the road in front of the vehicle, which is detected by the detection unit 100. Therefore, the control unit 300 may control the ride comfort of the vehicle.

Depending on the detected information on the road condition, it is determined whether there is a defect on the road in front of the vehicle (S511). The control unit 300 may determine whether there is a defect on the road whether the vehicle will enter, based on the information on the condition of the road in front of the vehicle, which is detected by the detection unit 100. Specifically, a reference for determining whether there is a defect on the road in front of the vehicle, based on the information detected by the detection unit 100, is preset in the control unit 300.

Therefore, on the basis of the preset determination reference, the control unit 300 may determine whether there is a defect on the road where the vehicle will enter, based on the information detected by the detection unit 100.

When it is determined that the road in front of the vehicle has a defect, the target damping force of the electronic control suspension 200 is calculated depending on the defect degree of the road (S512). The control unit 300 may determine the defect degree of the road where the vehicle enters, based on the preset determination reference. That is, the determination reference for determining the defect degree according to the depth or range of a bump or the like formed in the road where the vehicle will enter is preset in the control unit 300.

Further, the damping force of the electronic control suspension depending on the defect degree of the road where the vehicle will enter is preset in the control unit 300. Specifically, a table for adjusting the damping force of the electronic control suspension in consideration of the height or range of the bump formed on the road and the vehicle speed is preset in the control unit 300. Furthermore, the control unit 300 may compare the current damping force of the electronic control suspension with the preset damping force of the electronic control suspension corresponding to the defect degree on the road in front of the vehicle, and then calculate the target damping force of the electronic control suspension for controlling the electronic control suspension.

A current supplied to the electronic control suspension is controlled such that the electronic control suspension 200 has the calculated target damping force (S513). Specifically, the control unit 300 may control the current amount supplied to the current electronic control suspension 200 so that the electronic control suspension 200 has the calculated target damping force. Therefore, the control unit 300 may control the current amount supplied to the current electronic control suspension 200 so that the electronic control suspension 200 has the calculated target damping force. At this time, the target damping force of the electronic control suspension 200 may be the target damping force for the ride comfort control of the electronic control suspension 200 for controlling the ride comfort of the vehicle.

Therefore, the control unit 300 may control the electronic control suspension 200 to the target damping force so that the vehicle may enter the road in front of the vehicle while controlling the ride comfort. Thus, a driver or a passenger in the vehicle may feel stable ride comfort even though the vehicle passes the defective road.

Further, situation information on the road in front of the vehicle is detected (S400). Specifically, the detection unit 100 may detect the situation information of the road before the vehicle passes through the road.

Based on the detected situation information of the road, the damping force of the electronic control suspension is controlled, thus controlling the posture of the vehicle (S600). Specifically, the control unit 300 may control the damping force of the electronic control suspension 200 based on the situation information of the road in front of the vehicle, which is detected by the detection unit 100. Therefore, the control unit 300 may control the posture of the vehicle.

Depending on the detected situation information of the road, it is determined whether the anti-roll posture control or the anti-pitch posture control is required (S601). Specifically, the situation information of the road detected by the detection unit 100 may perform the anti-roll posture control of the vehicle based on the turning-state information of the road in front of the vehicle (S620), and the situation information of the road detected by the detection unit 100 may perform the anti-pitch posture control of the vehicle based on the information indicating whether it is necessary to accelerate or decelerate the vehicle on the road in front of the vehicle (S630).

When the detected situation information of the road is the turning-state information of the road in front of the vehicle, it is determined whether the anti-roll posture control is required to prevent the vehicle from being rotated about the longitudinal axis of the vehicle depending on the information (S621). Based on the turning-state information of the road in front of the vehicle, which is detected by the detection unit 100, the control unit 300 may determine whether the vehicle needs more turning or less turning when the vehicle enters the upcoming road.

Specifically, the control unit 300 may compare the driving direction of the current vehicle depending on the turning-state information on the road in front of the vehicle, which is detected by the detection unit 100, and then determine whether it is necessary to further adjust the steering angle compared to current setting when the vehicle enters the upcoming road.

Further, when it is determined that the anti-roll posture control is required (S621), the target damping force of the electronic control suspension 200 is calculated depending on the turning-state information of the road in front of the vehicle (S622). The control unit 300 may determine the turning-state degree of the road where the vehicle will enter, based on the preset determination reference. That is, the determination reference for determining this degree according to the information on the turning angle of the road where the vehicle will enter is preset in the control unit 300.

Furthermore, the damping force of the electronic control suspension depending on the information on the turning angle of the road where the vehicle will enter is preset in the control unit 300. Specifically, a table for adjusting the damping force of the electronic control suspension in consideration of the curvature of the road, the advancing direction of the current vehicle, and the vehicle speed is preset in the control unit 300. Furthermore, the control unit 300 may compare the current damping force of the electronic control suspension with the preset damping force of the electronic control suspension corresponding to the turning angle on the road in front of the vehicle, and then calculate the target damping force of the electronic control suspension for controlling the electronic control suspension.

A current supplied to the electronic control suspension is controlled such that the electronic control suspension 200 has the calculated target damping force (S623). Specifically, the control unit 300 may control the current amount supplied to the current electronic control suspension 200 so that the electronic control suspension 200 has the calculated target damping force. Therefore, the control unit 300 may control the current amount supplied to the current electronic control suspension 200 so that the electronic control suspension 200 has the calculated target damping force. At this time, the target damping force of the electronic control suspension 200 may be the target damping force for the anti-roll posture control of the electronic control suspension 200 for controlling the anti-roll posture of the vehicle.

Therefore, the control unit 300 may control the electronic control suspension 200 to the target damping force so that the vehicle may enter the road in front of the vehicle while controlling the anti-roll posture of the vehicle. Thus, it is possible to prevent the roll in which the vehicle rotates about the longitudinal axis thereof.

When the detected situation information of the road is the information indicating whether it is necessary to accelerate or decelerate the vehicle on the road in front of the vehicle, it is determined whether the anti-pitch posture control for preventing the vehicle from being rotated about the transverse axis of the vehicle is required (S631). The control unit 300 may determine whether the vehicle should be accelerated or decelerated when the vehicle enters the road in front of the vehicle, based on the information indicating whether it is necessary to accelerate or decelerate the vehicle on the road in front of the vehicle, which is detected by the detection unit 100. That is, the control unit 300 may determine whether it is necessary to accelerate or decelerate the current vehicle, based on the information, such as the inclination, width, or area of the upcoming road, which is detected by the detection unit 100.

Specifically, the control unit 300 may compare the speed of the current vehicle depending on the information indicating whether it is necessary to accelerate or decelerate the vehicle on the road in front of the vehicle, which is detected by the detection unit 100, and then determine whether it is necessary to further accelerate or decelerate the vehicle compared to current setting when the vehicle enters the upcoming road.

Further, when it is determined that the anti-pitch posture control is required, the target damping force of the electronic control suspension 200 is calculated depending on the information indicating whether it is necessary to accelerate or decelerate the vehicle on the road in front of the vehicle (S632). The control unit 300 may determine the acceleration or deceleration degree on the road where the vehicle will enter, based on the preset determination reference. That is, the determination reference for determining the gradient (range) of the acceleration or deceleration degree of the vehicle according to the information indicating whether it is necessary to accelerate or decelerate the vehicle on the road where the vehicle will enter is preset in the control unit 300.

Furthermore, the damping force of the electronic control suspension depending on the information indicating whether it is necessary to accelerate or decelerate the vehicle on the road in front of the vehicle where the vehicle will enter is preset in the control unit 300. Specifically, a table for adjusting the damping force of the electronic control suspension in consideration of the width of the road, the inclination of the road, and the current vehicle speed is preset in the control unit 300. Furthermore, the control unit 300 may compare the current damping force of the electronic control suspension with the preset damping force of the electronic control suspension corresponding to the increased or decreased amount of the acceleration or deceleration on the road in front of the vehicle, and then calculate the target damping force of the electronic control suspension for controlling the electronic control suspension.

A current supplied to the electronic control suspension is controlled such that the electronic control suspension 200 has the calculated target damping force (S623). Specifically, the control unit 300 may control the current amount supplied to the current electronic control suspension 200 so that the electronic control suspension 200 has the calculated target damping force. Therefore, the control unit 300 may control the current amount supplied to the current electronic control suspension 200 so that the electronic control suspension 200 has the calculated target damping force. At this time, the target damping force of the electronic control suspension 200 may be the target damping force for the anti-pitch posture control of the electronic control suspension 200 for controlling the anti-pitch posture of the vehicle.

Therefore, the control unit 300 may control the electronic control suspension 200 to the target damping force so that the vehicle may enter the road in front of the vehicle while controlling the anti-pitch posture of the vehicle. Thus, it is possible to prevent the pitch in which the vehicle rotates about the transverse axis thereof.

Alternatively, as shown in FIG. 5, in a method of controlling an electronic control suspension system for a vehicle according to another embodiment of the present disclosure, a step S500 of controlling the ride comfort of the vehicle may be performed prior to a step S600 of controlling the posture of the vehicle. Specifically, steps that are not illustrated in FIG. 5 may be performed in the same order as the configuration numbers of the method of controlling the electronic control suspension system for the vehicle according to an embodiment of the present disclosure.

In the method of controlling the electronic control suspension system for the vehicle according to an embodiment of the present disclosure, as shown in FIG. 5, the step S500 of controlling the ride comfort of the vehicle may be controlled prior to the step S600 of controlling the posture of the vehicle.

In this case, the vehicle may control the damping force of the electronic control suspension 200 for the vehicle in preference to the ride comfort of a driver.

Alternatively, as shown in FIG. 6, in a method of controlling an electronic control suspension system for a vehicle according to a further embodiment of the present disclosure, the step S600 of controlling the posture of the vehicle may be performed prior to the step S500 of controlling the ride comfort of the vehicle. Specifically, steps that are not illustrated in FIG. 6 may be performed in the same order as the configuration numbers of the method of controlling the electronic control suspension system for the vehicle according to an embodiment of the present disclosure.

In this case, the vehicle may control the damping force of the electronic control suspension 200 for the vehicle in preference to the posture control for preventing the vehicle from overturning.

For instance, in the step S600 of controlling the posture of the vehicle or the step S500 of controlling the ride comfort of the vehicle of the method of controlling the electronic control suspension system for the vehicle according to an embodiment of the present disclosure, the priority of the control method may be selected by a user.

As such, the method of controlling the electronic control suspension system for the vehicle according to an embodiment of the present disclosure may control the damping force of the electronic control suspension according to the information detected by the detection unit, thus controlling at least one of the ride comfort of the vehicle or the posture of the vehicle.

Thus, the damping force of the electronic control suspension can be adjusted in advance according to the information on the upcoming road while the vehicle is driving, thus providing stable ride comfort to a driver and effectively preventing the vehicle from overturning.

Although the present disclosure was described with reference to specific embodiments shown in the drawings, it is apparent to those skilled in the art that the present disclosure may be changed and modified in various ways without departing from the scope of the present disclosure, which is described in the following claims.

Therefore, the above-described embodiments are to be understood as illustrative and not restrictive. The scope of the present disclosure is defined by the claims that will be described later, and all changes or modifications derived from the meaning and scope of the claims and their equivalent concepts are included in the scope of the present disclosure.

[Detailed Description of Main Elements]

100: detection unit  200: electronic control suspension
300: control unit  101: electronic control suspension system of vehicle

What is claimed is:

1. An electronic control suspension system for a vehicle, comprising:
    a road detection unit detecting information on a condition of a road in front of the vehicle and detecting situation information on the road in front of the vehicle, wherein the situation information includes information on a turning state of the road in front of the vehicle;
    a vehicle state detection unit detecting information on the vehicle, including an acceleration in a longitudinal, transverse, and vertical directions of a body of the vehicle, an acceleration in a vertical direction of wheels of the vehicle, and a height of a suspension damper;
    an electronic control suspension which damping force is controlled by current; and
    a control unit is configured to adjust the damping force of the electronic control suspension according to the information on the condition of the road detected by the road detection unit and the information on the vehicle detected by the vehicle state detection unit to control ride comfort of the vehicle, and configured to adjust the damping force of the electronic control suspension according to situation information on the road in front of the vehicle detected by the road detection unit and the information on the vehicle detected by the vehicle state detection unit to control a posture of the vehicle,
    wherein the control unit is further configured to compare a current driving direction of the vehicle and the turning state of the road to determine whether an additional adjustment of a steering angle is required based on the comparison, and further configured to determine that the vehicle requires an anti-roll posture control when it is determined that the additional adjustment of the steering angle is required,
    wherein the damping force of the electronic control suspension is controlled either in preference to the ride comfort of the vehicle than the posture of the vehicle or in preference to the posture of the vehicle than the ride comfort of the vehicle according to a preference priority setting.

2. The electronic control suspension system of claim 1, wherein, when it is determined that the vehicle requires the anti-roll posture control, the control unit performs the anti-roll posture control by controlling the damping force of the electronic control suspension so as to prevent the vehicle from being rotated about a longitudinal axis thereof, based on the situation information detected by the road detection unit.

3. The electronic control suspension system of claim 1, wherein the situation information includes information indicating whether it is necessary to accelerate or decelerate the vehicle on the road in front of the vehicle.

4. The electronic control suspension system of claim 3, wherein the control unit controls the damping force of the electronic control suspension so as to prevent the vehicle from being rotated about a transverse axis thereof, based on the situation information detected by the road detection unit.

5. The electronic control suspension system of claim 1, wherein the road detection unit is any one of a camera, a radar, and a lidar.

6. A method of controlling an electronic control suspension system for a vehicle, comprising:
- detecting, by a road detection unit, information on a condition of a road in front of the vehicle and situation information on the road in front of the vehicle, wherein the situation information includes information on a turning state of the road in front of the vehicle;
- detecting information on the vehicle by a vehicle state detection unit, including an acceleration in a longitudinal, transverse, and vertical directions of a body of the vehicle, an acceleration in a vertical direction of wheels of the vehicle, and a height of a suspension damper;
- controlling a damping force of the electronic control suspension based on the information on the condition of the road and the information on the vehicle, thus controlling ride comfort of the vehicle; and
- controlling the damping force of the electronic control suspension based on the situation information on the road and the information on the vehicle, thus controlling a posture of the vehicle,
- comparing a current driving direction of the vehicle and the turning state of the road to determine whether an additional adjustment of a steering angle is required based on the comparison, and determining that the vehicle requires an anti-roll posture control when it is determined that the additional adjustment of the steering angle is required,
- wherein the damping force of the electronic control suspension is controlled either in preference to the ride comfort of the vehicle than the posture of the vehicle or in preference to the posture of the vehicle than the ride comfort of the vehicle according to a preference priority setting.

7. The method of claim 6, wherein the controlling of the ride comfort of the vehicle comprises:
- determining whether there is a defect on the road in front of the vehicle according to the information on the condition of the road;
- calculating a target damping force of the electronic control suspension depending on a defect degree of the road condition, when it is determined that there is the defect on the road in front of the vehicle; and
- controlling current supplied to the electronic control suspension so that the electronic control suspension has the calculated target damping force.

8. The method of claim 6, wherein the controlling of the posture of the vehicle comprises:
- determining whether an anti-pitch posture control is required so as to prevent the vehicle from being rotated about a transverse axis of the vehicle, when the detected situation information on the road in front of the vehicle is information indicating whether it is necessary to accelerate or decelerate the vehicle on the road in front of the vehicle.

9. The method of claim 6, wherein the controlling of the posture of the vehicle comprises:
- when it is determined that the anti-roll posture control is required, calculating a target damping force of the electronic control suspension depending on a turning-state degree of the road in front of the vehicle; and
- controlling current supplied to the electronic control suspension so that the electronic control suspension has the calculated target damping force.

10. The method of claim 8, wherein the controlling of the posture of the vehicle comprises:
- when it is determined that the anti-pitch posture control is required, calculating a target damping force of the electronic control suspension depending on a required acceleration or deceleration degree on the road in front of the vehicle; and
- controlling current supplied to the electronic control suspension so that the electronic control suspension has the calculated target damping force.

11. The method of claim 6, wherein the controlling of the ride comfort of the vehicle is performed prior to the controlling of the posture of the vehicle.

12. The method of claim 6, wherein the controlling of the posture of the vehicle is performed prior to the controlling of the ride comfort of the vehicle.

13. The method of claim 6, wherein the preference priority setting is selected by a user.

14. The electronic control suspension system of claim 1, wherein the preference priority setting is selected by a user.

15. The electronic control suspension system of claim 1, wherein the situation information on the road in front of the vehicle includes a width of the road in front of the vehicle, and the control unit is configured to adjust the damping force of the electronic control suspension according to the situation in formation including the width of the road in front of the vehicle.

16. The method of claim 6, wherein the situation information on the road in front of the vehicle includes a width of the road in front of the vehicle, and the damping force of the electronic control suspension is controlled according to the situation in formation including the width of the road in front of the vehicle.

* * * * *